(12) United States Patent
Niewiadomski et al.

(10) Patent No.: US 10,768,003 B2
(45) Date of Patent: Sep. 8, 2020

(54) VEHICLE ROUTE PLANNING

(71) Applicant: Ford Global Technologies, LLC, Dearborn, MI (US)

(72) Inventors: Luke Niewiadomski, Hamtramck, MI (US); Erick Michael Lavoie, Dearborn, MI (US); Roger Arnold Trombley, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 50 days.

(21) Appl. No.: 15/934,192

(22) Filed: Mar. 23, 2018

(65) Prior Publication Data

US 2019/0293442 A1    Sep. 26, 2019

(51) Int. Cl.
*G01C 21/34* (2006.01)
*G05D 1/02* (2020.01)
*G08G 1/0967* (2006.01)

(52) U.S. Cl.
CPC ..... *G01C 21/3461* (2013.01); *G01C 21/3469* (2013.01); *G01C 21/3492* (2013.01); *G05D 1/0212* (2013.01); *G08G 1/096725* (2013.01)

(58) Field of Classification Search
CPC ............ G01C 21/3461; G01C 21/3469; G01C 21/3492; G05D 1/0212; G08G 1/096725
See application file for complete search history.

(56) References Cited

U.S. PATENT DOCUMENTS

| 8,583,333 | B2 | 11/2013 | Rennie et al. |
| 9,373,258 | B2 | 6/2016 | Groeneweg |
| 2013/0080052 | A1* | 3/2013 | Gooding ............ G01C 21/3407 701/468 |
| 2013/0110284 | A1 | 5/2013 | Kadaba |
| 2014/0260188 | A1 | 9/2014 | Seok |
| 2015/0039361 | A1* | 2/2015 | Crowther ........... G06Q 10/0631 705/7.12 |
| 2015/0106299 | A1* | 4/2015 | Rennie .................. G06Q 50/10 705/345 |

FOREIGN PATENT DOCUMENTS

| JP | 2017137649 A | 8/2017 |
| KR | 191571288 B1 | 1/2016 |

OTHER PUBLICATIONS

Crowe, "Meet Kobi, Your New All-Season Robot Landscaper", Robotics Trends, Sep. 29, 2016.
La Bastide, "Daimler Has Revealed Its Fleet of Autonomous Snow Plow Trucks for Airports", Autonomous Cars, Oct. 19, 2017.

\* cited by examiner

*Primary Examiner* — Abby Y Lin
*Assistant Examiner* — Renee LaRose
(74) *Attorney, Agent, or Firm* — Frank A. MacKenzie; Bejin Bieneman PLC

(57) ABSTRACT

A system includes a computer including a processor and a memory, the memory storing instructions executable by the processor to determine a route based on at least one of (a) an amount of snow accumulation, and (b) a predicted amount of remediation material, for each of a plurality of road segments, actuate a vehicle to follow the route, and actuate at least one of a snow plow and a material spreader on the vehicle.

15 Claims, 4 Drawing Sheets

VEHICLE ROUTE PLANNING

BACKGROUND

Roadways can accumulate snow during winter. Snow on roadways can affect vehicles driving on the roadways. For example, tires of the vehicles may slip on the snow, increasing a probability of an accident on the roadway. Typically, a dedicated vehicle can include a snow plow and remediation material to remove and/or mitigate the snow accumulation on the roadway. However, it is a problem to identify and analyze snow accumulation on specific portions of the roadway that require snow removal and to determine to clear various portions.

DETAILED DESCRIPTION

Figure 1:
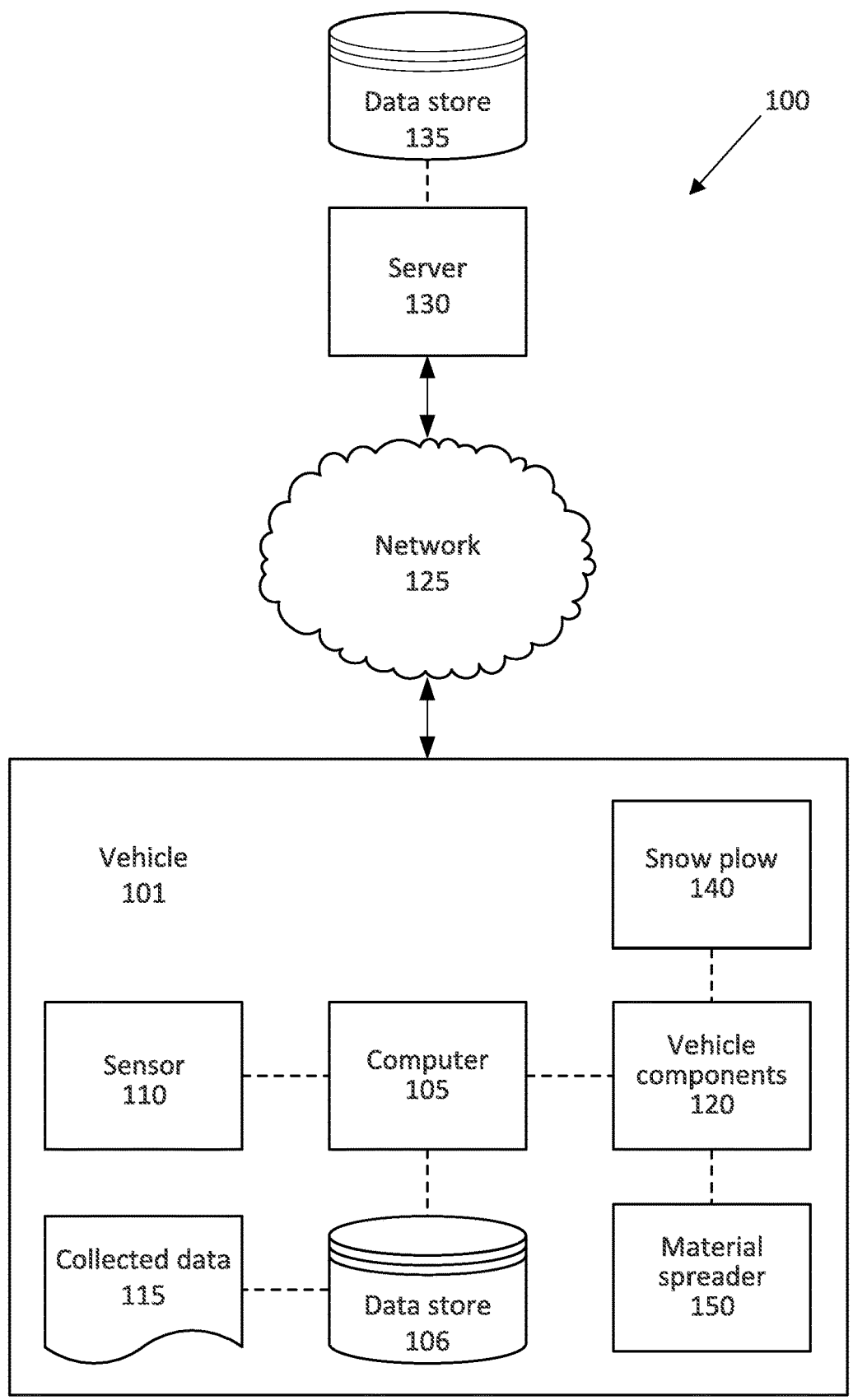
FIG. 1 is a block diagram of an example system for clearing snow accumulation.

A system includes a computer including a processor and a memory, the memory storing instructions executable by the processor to determine a route based on at least one of (a) an amount of snow accumulation, and (b) a predicted amount of remediation material, for each of a plurality of road segments, to actuate a vehicle to follow the route, and to actuate at least one of a snow plow and a material spreader on the vehicle.

The route can be based on at least one of a location of the road segment, a fuel amount to reach the road segment, a number of emergency vehicles in the road segment, a road grade of the road segment, and a curvature of the road segment.

The instructions can further include instructions to actuate a second vehicle to follow a second route including a road segment not in the route.

The instructions can further include instructions to determine a snow accumulation threshold based on a predicted number of emergency vehicles on each road segment and to determine the route to include at least one road segment having an amount of snow accumulation exceeding the snow accumulation threshold.

The instructions can further include instructions to determine a second route and, when the vehicle completes the route, to actuate the vehicle to follow the second route.

The instructions can further include instructions to determine a clearing priority value for each road segment based on at least one of the amount of snow accumulation and the predicted amount of material for each of a plurality of road segments, and to determine the route to include the road segment with the highest clearing priority value, the clearing priority value of one of the road segments being a measure of a priority to clear the road segment.

The instructions can further include instructions to determine a second route to include the road segment with the highest clearing priority value and that is not in the route.

The instructions can further include instructions to determine a snow accumulation threshold based on a predicted number of vehicles on each road segment and to determine the route to include at least one road segment having an amount of snow accumulation exceeding the snow accumulation threshold.

The instructions can further include instructions to receive data from the vehicle following the route and to determine a new route based on the data from the vehicle.

A method includes determining a route based on at least one of (a) an amount of snow accumulation and, (b) a predicted amount of remediation material, for each of a plurality of road segments, actuating a vehicle to follow the route, and actuating at least one of a snow plow and a material spreader on the vehicle.

In the method, the route can be based on at least one of a location of the road segment, a fuel amount to reach the road segment, a number of emergency vehicles in the road segment, a road grade of the road segment, and a curvature of the road segment.

The method can further include actuating a second vehicle to follow a second route including a road segment not in the route.

The method can further include determining a clearing priority value for each road segment based on at least one of the amount of snow accumulation and the predicted amount of material for each of a plurality of road segments, and determining the route to include the road segment with the highest clearing priority value, the clearing priority value of one of the road segments being a measure of a priority to clear the road segment.

The method can further include receiving data from the vehicle following the route and determining a new route based on the data from the vehicle.

A system includes a vehicle including at least one of a snow plow and a remediation material spreader, means for determining a route based on at least one of (a) an amount of snow accumulation, and (b) a predicted amount of remediation material, for each of a plurality of road segments, and means for actuating at least one of the snow plow and the remediation material spreader when the vehicle follows the route.

In the system, the route can be based on at least one of a location of the road segment, a fuel amount to reach the road segment, a number of emergency vehicles in the road segment, a road grade of the road segment, and a curvature of the road segment.

The system can further include means for actuating a second vehicle to follow a second route including a road segment not in the route.

The system can further include means for determining a clearing priority value for each road segment based on at least one of the amount of snow accumulation and the predicted amount of material for each of a plurality of road segments, and means for determining the route to include the road segment with the highest clearing priority value, the clearing priority value of one of the road segments being a measure of a priority to clear the road segment.

The system can further include means for receiving data from the vehicle following the route and means for determining a new route based on the data from the vehicle.

The system can further include means for determining a second route to include the road segment with the highest clearing priority value and that is not in the route.

Further disclosed is a computer programmed to execute any of the above method steps. Yet further disclosed is a vehicle comprising the computer. Yet further disclosed is a computer program product, comprising a computer readable medium storing instructions executable by a computer processor, to execute any of the above method steps.

A server computer that collects data about snow accumulation on road segments can determine a list of road segments ordered by priority of need or urgency to clear the snow accumulation. The server can, based on the priority, actuate computers in one or more vehicles to clear the road segments. The vehicles can be conventional vehicles that have snow plows and/or remediation material spreaders attached. The server can determine the priority based on, e.g., an amount of emergency vehicles, emergency services located on the road segments, etc. By analyzing each road segment and assessing a priority, the server can more quickly clear road segments used by emergency vehicles and in high traffic areas.

FIG. 1 illustrates an example system 100 for operating a vehicle 101 to clear snow accumulation. A computer 105 in the vehicle 101 is programmed to receive collected data 115 from one or more sensors 110. For example, vehicle 101 data 115 may include a location of the vehicle 101, data about an environment around a vehicle, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 can be of any type, e.g., hard disk drives, solid state drives, servers, or any volatile or non-volatile media. The data store 106 can store the collected data 115 sent from the sensors 110.

Sensors 110 can include a variety of devices. For example, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a position of a component, evaluating a slope of a roadway, etc. The sensors 110 could, without limitation, also include short range radar, long range radar, LIDAR, and/or ultrasonic transducers.

Collected data 115 can include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 can include a plurality of vehicle components 120. In this context, each vehicle component 120 includes one or more hardware components adapted to perform a mechanical function or operation—such as moving the vehicle 101, slowing or stopping the vehicle 101, steering the vehicle 101, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, and the like.

When the computer 105 operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator. In a non-autonomous mode, i.e., a manual mode, the vehicle 101 propulsion, braking, and steering are controlled by the human operator.

The system 100 can further include a network 125 connected to a server 130 and a data store 135. The computer 105 can further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The vehicle 101 can include a conventional snow plow 140. The snow plow 140 can move snow on a roadway. As described below, the snow plow 140 can be attached to the vehicle 101. The computer 105 can actuate the snow plow 140 to move the snow plow 140 from a stowed position to a deployed position. In the deployed position, the snow plow 140 can move snow on the roadway.

The vehicle 101 can include a conventional material spreader 150. The material spreader 150 can spread remediation material on the roadway. The remediation material can be, e.g., a salt, gravel, sand, etc., and can melt snow and/or ice on the roadway and/or provide friction for vehicle 101 wheels, reducing slipping of the vehicle 101 wheels. As described below, the material spreader 150 can be attached to a rear end of the vehicle 101. The computer 105 can actuate the material spreader 150 from a closed position to an open position to deposit remediation material onto the roadway.

Figure 2:
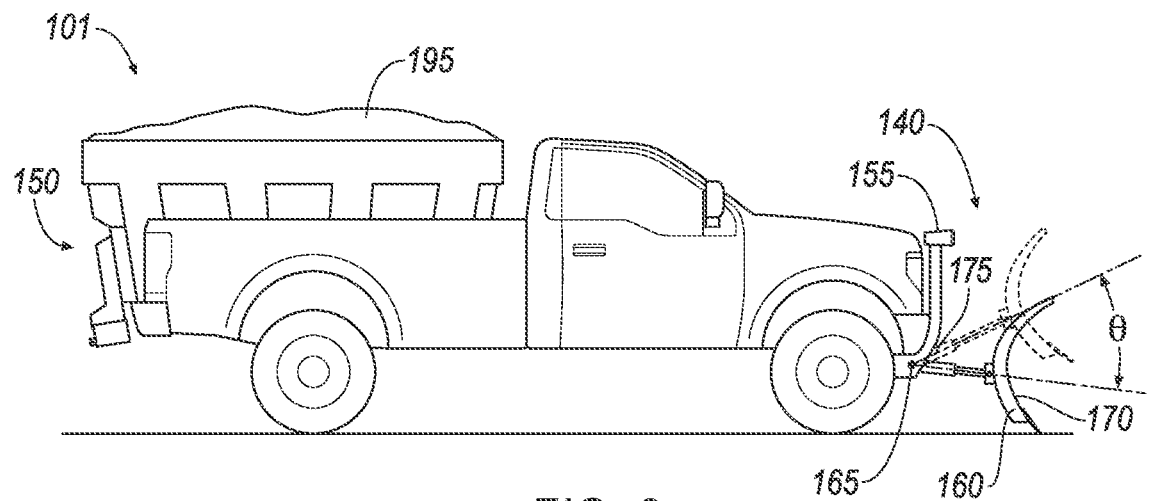
FIG. 2 illustrates an example snow plow of an example vehicle.

FIG. 2 illustrates an example vehicle 101 with a snow plow 140 and a material spreader 150. The vehicle 101 has a front end 155. The snow plow 140 can be attached to the front end 155, allowing the snow plow 140 to move snow as the vehicle 101 moves forward. The snow plow 140 can be removable from the front end 155. FIG. 2 shows the stowed position of the snow plow 140 in dashed lines and the deployed position of the snow plow 140 in solid lines.

The snow plow 140 includes a plow 160. The plow 160 engages the snow on the roadway. The plow 160 is rotatable about a pivot 165. The plow 160 can include a curved surface 170. When the curved surface 170 engages the snow, the snow can move along the curved surface 170. The plow 160 can collect snow along the curved surface 170, moving the snow from the roadway as the vehicle 101 moves forward.

The snow plow 140 includes a motor 175. The motor 175 rotates the plow 160 from a stowed position to a deployed position. In the stowed position, the plow 160 does not engage snow on the roadway. In the deployed position, the plow 160 engages snow on the roadway. The computer 170 can actuate the motor 175 to rotate the plow 160 to a plow angle θ. The plow angle θ is defined as the angle swept from the pivot 165 between the current position of the plow 160 and the stowed position. That is, the plow angle θ is 0 when the plow 160 is in the stowed position. Based on the height of the front end 155 from the ground and how the snow plow 140 is attached to the front end 155, the plow angle θ when the plow 160 is in the deployed position can vary. For example, based on the height of the front end 155, the plow angle θ can increase from the stowed position to the deployed position.

The computer 105 can actuate the motor 175 to move the plow 160 a specified plow angle θ. Based on the amount of snow accumulation in the roadway, the computer 105 can determine a specific plow angle θ to move the snow. For example, the computer 105 can actuate the motor 175 to the deployed position to move the snow on the current portion of the roadway and then move the plow 160 to a plow angle θ between the stowed position and the deployed position for the next portion of the roadway (e.g., where there is no snow accumulation) and then move the plow 160 to the deployed position during the following portion of the roadway (e.g., where there is snow accumulation). In another example, when a road grade of a current road segment is higher than a previous road segment, the plow 160 may contact the ground in the deployed position. The computer 105 can actuate the motor 175 to move the plow 160 to a plow angle θ to suspend the plow 160 above the ground.

Figure 3:
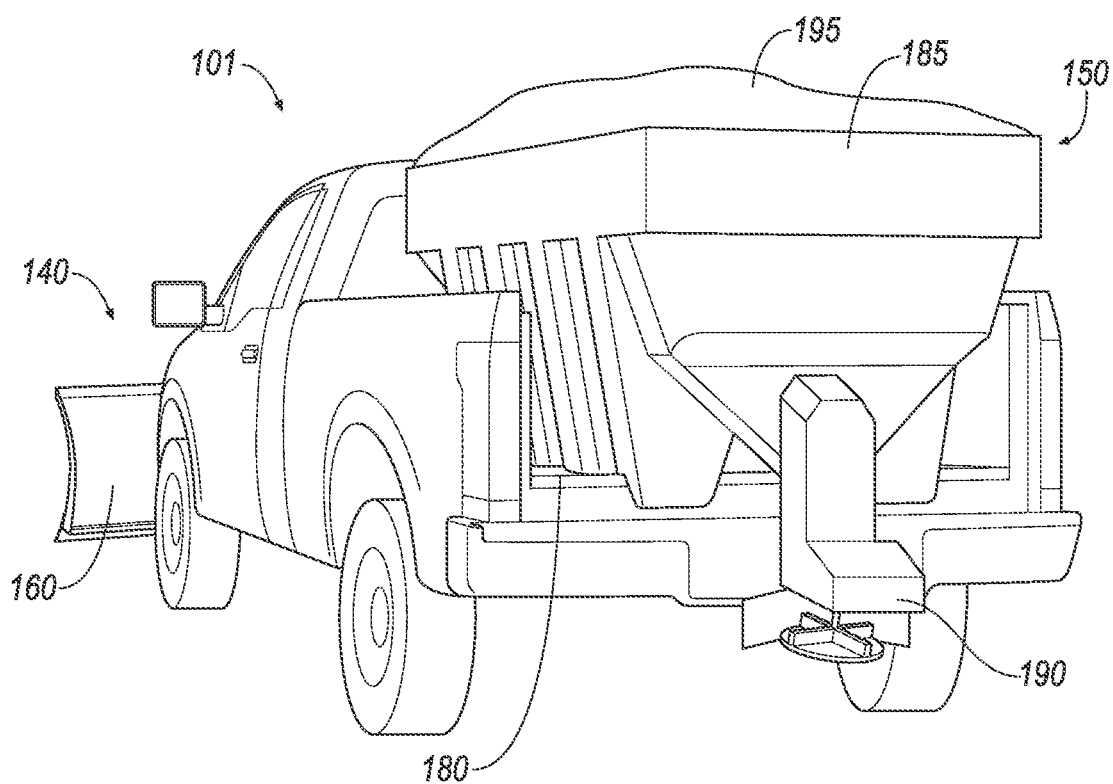
FIG. 3 illustrates an example material spreader of the example vehicle of FIG. 2.

FIG. 3 illustrates the example vehicle 101 to show the material spreader 150. The material spreader 150 can be attached to a rear end 180 of the vehicle 101. When the material spreader 150 is attached to the rear end 180 of the vehicle 101, the material spreader 150 can spread remediation material behind the vehicle 101 as the vehicle 101 moves forward. Alternatively (not shown in the Figures), the material spreader 150 can be attached to the front end 155 of the vehicle 101. When the vehicle 101 has the material spreader 150 attached to the front end 155, the vehicle 101 does not include the snow plow 140.

The material spreader 150 includes a material store 185 and a material depositor 190. The material store 185 holds remediation material 195. The material store 185 can be, e.g., a basin, a box, a container, etc., configured to hold the remediation material 195. The material depositor 190 can be, e.g., a door, a slot, a screw-shaped plane, etc. That is, the material depositor 190 can be shaped to deposit the remediation material 195 straight down or can be designed to spread the remediation material 195 away from the vehicle 101 across the roadway, increasing a surface area of the roadway covered by the remediation material 195. The material depositor 190 can be movable from a closed position to an open position. When the material depositor 190 is in the open position, remediation material 195 moves from the material store 185 through the material depositor 190 to the roadway. The computer 105 can actuate the material depositor 190 to allow the remediation material 195 to move from the material store 185 to the roadway.

The computer 105 can determine an amount of remediation material 195 deposited by the material spreader 150. Based on empirical testing and a size of the material depositor 190, the computer 105 can determine a deposit rate of the remediation material 195. That is, when the material depositor 190 is in the open position, remediation material 195 will move from the material store 185 through the material depositor 190 to the roadway at a substantially constant rate based on the size of the material depositor 190. The computer 105 and/or the server 130 can determine to deposit a specific amount of remediation material 195 on the roadway, and based on the deposit rate, the computer 105 can actuate the material depositor 190 to the open position for a specified period of time to deposit the specific amount of remediation material 195.

The computer 105 and/or the server 130 can determine the specific amount of remediation material 195 to deposit based on, e.g., a specific type of roadway, a posted speed limit, etc. For example, portions of the roadway can be manually designated as "residential" and portions of the roadway can be designated, e.g., via user input, as "highway." The computer 105 and/or the server 130 can specify a first amount of remediation material 195 for "residential" portions and a second amount of remediation material 195 for "highway" portions. Alternatively, the computer 105 and/or the server 130 can determine the "residential" and "highway" portions based on a posted speed limit, e.g., roadways with a posted speed limit of 55 mph or greater can be designated, e.g., via user input, as "highway" and roadways with a posted speed limit of less than 55 mph can be designated as "residential." The computer 105 and/or the server 130 can further determine the specific amount of remediation material 195 based a length of the roadway.

Figure 4:
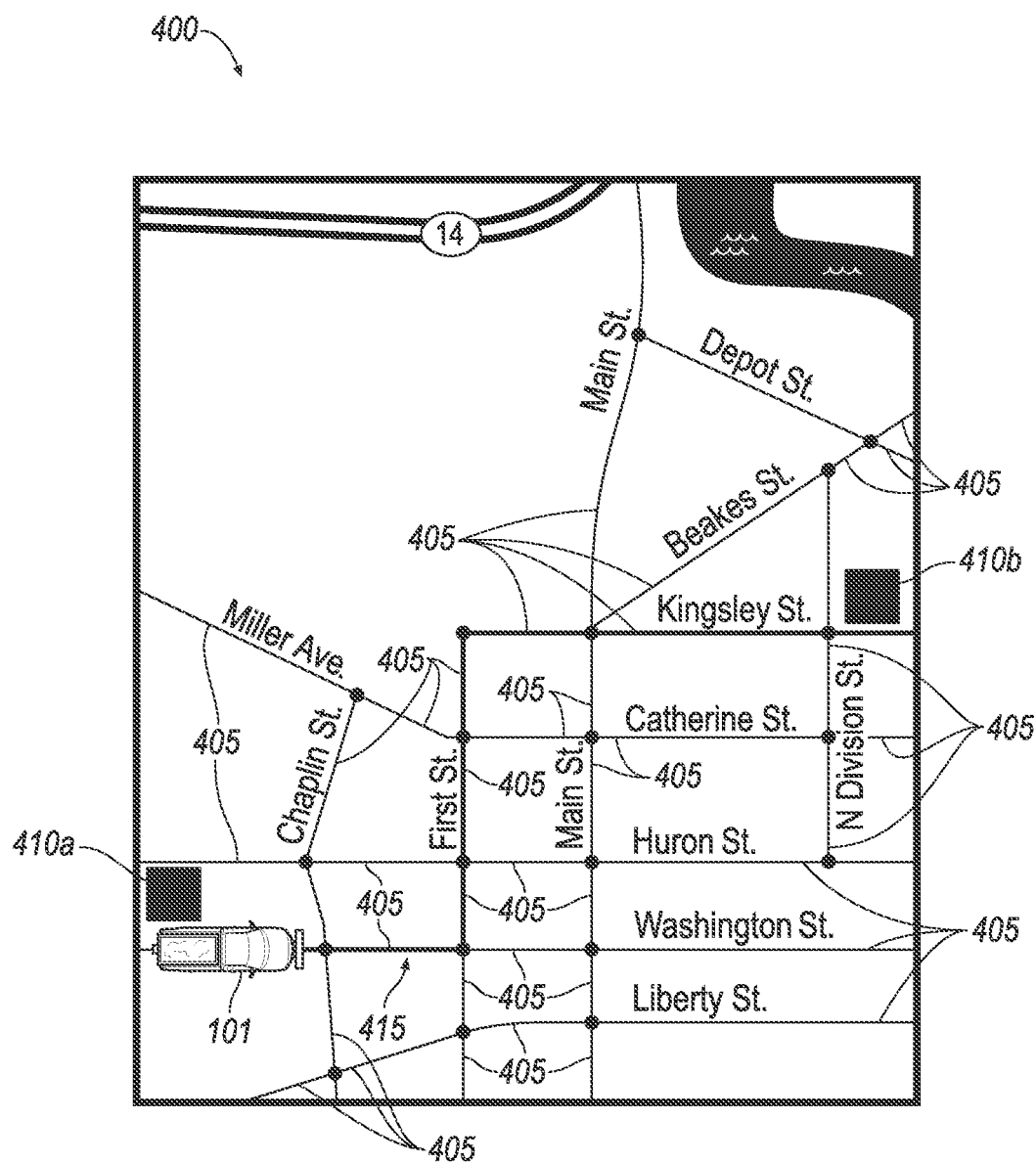
FIG. 4 illustrates an example map.

FIG. 4 illustrates an example map 400 including a plurality of road segments 405. The map 400 can be stored in the server 130. As used herein, a "road segment" 405 is a portion of a roadway from which data 115 are collected. In the example of FIG. 4, the road segments 405 are respective portions of the roadway between the circular dots, which indicate intersections of streets. Alternatively, the road segments 405 can be determined to include different portions of the roadway, e.g., including one or more intersections of streets.

The map can include at least one snow clearing hub 410. FIG. 4 illustrates two snow clearing hubs 410a, 410b. The snow clearing hub 410 can house a plurality of vehicles 101 provided to clear road segments 405 of snow and/or ice. For example, the vehicles 101 can be vehicles 101 that have a snow plow 140 and a material spreader 150 attached to the respective vehicle 101 body, but is not a dedicated snow clearing vehicle 101.

The server 130 can determine a route 415 for a vehicle 101 to clear a roadway. The route 415 includes a plurality of road segments 405. The route 415 can be a series of road segments 405 from a start point to an end point. The server 130 can instruct the computer 105 of the vehicle 101 to actuate one or more components 120 to follow the route 415. In the example of FIG. 4, the road segments 405 in the route 415 are identified with numerals. The server 130 can determine a plurality of routes 415, each route 415 including a plurality of road segments 405. The server 130 can instruct a computer 105 in each of a plurality of vehicles 101 to follow one or more of the plurality of routes 415.

The server 130 can determine an amount of snow accumulation for each road segment 405. The server 130 can collect data 115 from, e.g., one or more precipitation sensors 110 on the road segments, a weather source that measures snow accumulation, data 115 from image sensors 110 on vehicles 101 travelling on road segments 405, etc. Based on the data 115, the server 130 can determine an amount, i.e. a depth measured in centimeters or inches, of snow accumulation for each road segment 405. The server 130 can further determine an amount of ice for each road segment 405 based on data 115 from, e.g., one or more precipitation sensors 110, the weather source, image sensors 110 from vehicles 101 travelling on the road segments 405, etc.

The server 130 can determine an amount of remediation material 195 for each road segment 405. Based on the amount of snow accumulation, the server 130 can determine the amount of remediation material 195 for each road segment 405 to mitigate and/or melt the snow accumulation. For example, the server 130 can determine a surface area of the road segment 405 based on a length of the road segment 405 and a number of roadway lanes in the road segment 405. Based on the surface area, the server 130 can determine an amount of remediation material based on, e.g., conventional correlations or rules specifying a volume of remediation material to mitigate a determined volume (e.g., based on a measured or reported depth of precipitation) of snow and/or a volume of ice. Furthermore, the server 130 can predict an amount of snow accumulation removed by the snow plow 140 and can determine the amount of remediation material 195 based on the remaining snow accumulation and the surface area of the road segment 405.

The server 130 can determine a plurality of factors for each road segment 405. The factors indicate an amount of snow accumulation, a predicted amount of remediation material 195, and a priority to clear each road segment 405. Based on the factors, the server 130 can determine a clearing priority value for each road segment 405. The clearing priority value can be a numerical value that indicates a priority of the road segment 405 to be cleared. For example, the clearing priority value can be an integer value between 1 and 4, as described below, where 4 indicates a lowest priority and 1 indicates a highest priority. Alternatively, the server 130 can assign specific clearing priority values to specific road segments 405 based on user input.

The server 130 can instruct the computer 105 to clear the road segment 405 having a highest clearing priority value, and can determine a route 415 including the road segment 405 having the highest clearing priority value. Based on the location of the road segment 405 with the highest clearing priority value, the server 130 can include adjacent road segments 405 to form the route 415. The clearing priority value can be determined based on a plurality of factors, as described below. The clearing priority value can be a sum of the factors. Alternatively, the clearing priority value can be a weighted sum of the factors. The server 130 can, upon determine the clearing priority values for the road segments, rank the road segments 405 from the highest clearing priority value to the lowest clearing priority value, i.e., from the road segment 405 that requires the most immediate clearing to the road segment 405 that requires the least immediate clearing.

The server 130 can determine a cost factor. The cost factor for a road segment 405 is based on an amount of fuel consumed by a vehicle 101 to clear the road segment and a price of an amount of remediation material 195 spread by the vehicle 101 to clear the road segment. The server 130 can predict the amount of fuel and the amount of remediation material 195 for each road segment 405 and determine a predicted cost for the vehicle 101 to clear the road segment 405. For example, the server 130 can compare a length of the road segment 405 to a predetermined typical fuel economy of a vehicle 101 clearing the road segment to predict the amount of fuel required to clear the road segment 405. In another example, the server 130 can determine a surface area of the road segment based on a number of roadway lanes in the road segment 405 and the length of the road segment and can predict the amount of remediation material 195 to cover the surface area of the road segment 405. The cost factor can be an output of a function that takes inputs of the fuel and the remediation material 195, the cost factor output from the function increasing for increasing amounts of fuel and remediation material 195.

The server 130 can determine a traffic factor. The traffic factor for a road segment 405 is based on a predicted number of people travelling on the road segment 405. The traffic factor can be a numerical value representing a threshold for snow accumulation, e.g., a number of inches of snow accumulation. For example, as the predicted number of people travelling on the road segment 405 increases, the threshold for snow accumulation decreases, such that less snow needs to accumulate before the server 130 determines to clear the road segment 405. The traffic factor can be based on, e.g., historical traffic information stored in the data store 135 that is tabulated according to the time of day. The server 130 can compare the current time of day to the historical traffic information to determine a predicted number of people travelling on the road segments 405. The server 130 can receive additional traffic data 115 from, e.g., cameras 110 installed on the road segments 405. Each traffic factor be associated with a snow accumulation threshold, i.e., an amount of snow accumulation beyond which the server 130 determines to clear the road segment 405. For example, road segments 405 with a traffic factor of 1 can have a first show accumulation threshold of 0.5 inches, i.e., when snow accumulation in the road segment 405 exceeds 0.5 inches, the server 130 can instruct a computer 105 in a vehicle 101 to clear the road segment.

Each road segment 405 can be assigned one of the four traffic factors listed in Table 1 based on predicted traffic rates from data 115 sources, e.g., traffic models, sensors 110 on the roadway, etc. Table 1 shows example traffic factors based on a posted speed limit and a predicted peak traffic rate:

TABLE 1

Traffic Factors for Road Segments

| | | Peak Traffic Rate Expected in Next 6 hours | | | |
|---|---|---|---|---|---|
| | | 100+ cars/min | 50-99 cars/min | 5-49 cars/min | 0-4 cars/min |
| Road Speed Limit | 65 mph+ | 1 | 1 | 2 | 2 |
| | 45 mph-64 mph | 1 | 2 | 2 | 3 |
| | 30 mph-44 mph | 2 | 2 | 3 | 3 |
| | 0 mph-29 mph | 3 | 3 | 4 | 4 |

The server 130 can determine an emergency vehicle factor. The emergency vehicle factor for a road segment 405 is based on a predicted number of emergency vehicles travelling on the road segment 405. Emergency vehicles can include, e.g., ambulances, police vehicles, fire trucks, etc. The emergency vehicle factor can be a second threshold for snow accumulation, e.g., a numerical value for a number of inches of snow accumulation. For example, as the predicted number of emergency vehicles travelling on the road segment 405 increases, the second threshold for snow accumulation decreases, such that less snow needs to accumulate before the server 130 determines to clear the road segment 405. The emergency vehicle factor can be lower than the traffic factor, i.e., the server 130 can determine to clear the road segment 405 with less snow accumulation based on the emergency vehicle factor than based on the traffic factor. Thus, road segments 405 frequented by emergency vehicles can have a higher priority than road segments 405 without emergency vehicles. For example, each of the priority values from 1 to 4 can be associated with a different number of emergency vehicles, e.g., 0 emergency vehicles results in an emergency vehicle factor of 4, 1-2 emergency vehicles results in an emergency vehicle factor of 3, 3-4 emergency vehicles results in an emergency vehicle factor of 2, and more than 4 emergency vehicles results in an emergency vehicle factor of 1.

The server 130 can predict the number of emergency vehicles travelling on the road segment 405 based on, e.g., historical data of emergency vehicle movement in the map 400 stored in the data store 135 tabulated according to the time of day. The server 130 can compare the current time of day to the historical traffic information to determine a predicted number of emergency vehicles travelling on the road segment 405. Alternatively, the server 130 can receive notifications from emergency vehicles indicating current locations of the emergency vehicles and current trajectories of the emergency vehicles. The server 130 can then predict road segments 405 in which there are currently emergency vehicles and road segments 405 where, based on the trajectories, the emergency vehicles will go. Alternatively or additionally, the server 130 can receive data 115 about ongoing emergencies, e.g., fires, accidents, etc., and can identify road segments 405 between the emergencies and locations of emergency services, e.g., hospitals, fire stations, etc. That is, emergency vehicles from the locations of the emergency services move along specific road segments 405 to get to the ongoing emergencies. The server 130 can determine the emergency vehicle factor based on the identified road segments 405. The server 130 can assign an emergency vehicle factor as an integer from 1-4, as described above, corresponding to one of the snow accumulation thresholds.

The server 130 can determine a location factor. The location factor for a road segment 405 is based on facilities or events located on or near the road segment 405 that require priority for clearing. Facilities can include, e.g., hospitals, fire stations, snow clearing hubs 410, etc. Furthermore, the location factor can be based on whether an active emergency, e.g., a fire, a vehicle accident, a medical crisis, etc., is occurring in the road segment 405. If an active emergency is occurring in the road segment 405, the server 130 can increase the location factor, increasing the priority of clearing the road segment 405. The location factor can be an integer value that counts the number of facilities and events located on the road segment 405. Based on the number of facilities and events on the road segment 405, the server 130 can assign the location factor as an integer from 1-4, as described above for the traffic factor, corresponding to one of the snow accumulation thresholds.

The server 130 can determine a road shape factor. The road shape factor for a road segment 405 is based on a road grade and/or a curvature of the road segment 405. Road segments 405 with steeper road grades and/or greater curvatures can cause vehicles 101 to slip, so the road shape factor can increase with increasing road grade and/or curvature. The road grade and curvature of the road segment 405 can be a predetermined value stored in the data store 135 measured from, e.g., municipal surveys, road grade sensors 110 on vehicles 101, etc. Thus, the road shape factor can be a predetermined value based on the stored road grades and curvatures. The road shape factor can be an integer from 1-4, as described above.

The server 130 can determine a jurisdiction factor. The server 130 can determine whether the road segment 405 is within a specific jurisdiction, e.g., a municipality, a county, a parish, a prefecture, a city, a state, etc. The server 130 can be programmed to clear road segments 405 within a specific jurisdiction. Thus, road segments 405 outside the specific jurisdiction can be excluded from clearing by the server 130. The jurisdiction factor can be a Boolean value that is either 0 or 1, with road segments 405 in the jurisdiction having a value of 1 and road segments 405 outside of the jurisdiction having a value of 0.

The server 130 can determine an accident factor. The accident factor is based on accident statistics for the road segment 405. The accident factor can be a third threshold for snow accumulation, e.g., a numerical value for a number of inches of snow accumulation. The accident factor can decrease when a frequency of accidents determined from the accident statistics increases, reducing the amount of snow accumulation required to clear the road segment 405. That is, road segments 405 having a higher probability of accidents can be cleared sooner than road segments 405 having a lower probability of accidents. The accident factor can be determined based on historical accident statistics data 115 tabulated for the road segments 405 based on specific times of day. The server 130 can compare the current time of day to the accident statistics data 115 to predict a frequency of accidents for the road segments. Based on the accident statistics data, on the road segment 405, the server 130 can assign the accident factor as an integer from 1-4, as described above, corresponding to one of the snow accumulation thresholds.

The server 130 can determine a temperature factor. The temperature factor for a road segment 405 is based on a current air temperature. The air temperature can change a rate of snow accumulation and snow melting. The temperature factor can be a fourth threshold for snow accumulation, e.g., a numerical value for a number of inches of snow accumulation, that increases as the air temperature increases. That is, as the air temperature becomes warmer, the fourth threshold can increase, indicating that more snow must accumulate (because the higher air temperature can melt the snow more quickly) before the server 130 determines to clear the road segment 405. For example, the temperature factor can be an output of a function that linearly increases based on an input temperature. In another example, based on the temperature, the server 130 can assign the temperature factor as an integer from 1-4 (each value of 1-4 assigned to a temperature range), as described above for the traffic factor, corresponding to one of the snow accumulation thresholds.

The server 130 can, based on the factors described above, determine the clearing priority value for each road segment 405. For example, the clearing priority value can be a weighted average of the factors, with each factor having a respective weighting value. The weighting value can be a number that is multiplied to the factor to represent a relative importance of the factor relative to the other factors. For example, the weighting value for the location factor can be larger than the weighting value for the temperature factor so that the clearing priority value will increase more quickly with increasing numbers of locations of emergency services and accidents, and the road segments 405 that have higher location factors result in higher clearing priority values than road segments 405 with higher temperature factors. The weighting values for the factors can be predetermined and stored in the data store 135, and can be determined based on which factors should result in higher priority for clearing. In another example, the clearing priority value can be an average of one or more of the factors which is then multiplied by the jurisdiction factor. As described above, the jurisdiction factor is a Boolean value that is either 0 or 1. Multiplying the other factors by the jurisdiction factor results in the clearing priority value for road segments 405 outside of the jurisdiction 0, regardless of the values of the other factors, indicating that the server 130 should not clear road segments 405 outside of the jurisdiction.

The server 130 can, based on the average or weighted average of the factors, determine an integer value for the clearing priority value that is one of 1, 2, 3, or 4. The average of the factors can be a non-integer value, e.g., 2.4, and the server 130 can determine an integer value from the non-integer value. For example, the server 130 can apply a floor function, i.e., take the non-integer value down to the previous integer. A non-integer value of 2.4, when the floor function is applied, would result in an integer value of 2. The server 130 can apply a ceiling function, i.e., take the non-integer value up to the next integer, e.g., from 2.4 to 3. The server 130 can apply a different function to get an integer value, e.g., a rounding function to the nearest integer, a truncation function to remove the fractional part, etc. Upon determining an integer value for the clearing priority value, the server 130 can determine a snow accumulation threshold based on Table 2:

TABLE 2

Snow Accumulation Thresholds

| Clearing Priority Value | Snow Accumulation Threshold |
|---|---|
| 1 | 0.5 inches |
| 2 | 1.0 inches |
| 3 | 2.0 inches |
| 4 | 3.0 inches |

The server 130 can determine a list of road segments 405 ranked according to their respective clearing priority values.

The server 130 can determine a road segment 405 having a highest clearing priority value. The server 130 can identify a snow clearing hub 410 closest to the road segment having the highest clearing priority value. When more than one road segment 405 has the same clearing priority value that is the highest clearing priority value (e.g., two or more segments 405 have a clearing priority value of 1), the server 130 can determine one of the segments 405 as the road segment 405 with highest priority based on, e.g., the road segment 405 closest to one of the clearing hubs 410. The server 130 can determine a route 415 for a vehicle 101 starting at the identified snow clearing hub 410, including the road segment 405 having the highest clearing priority value, and ending at the identified snow clearing hub 410. Alternatively, the server 130 can determine the route 415 to start at the first hub 410a, to include the road segment 405 having the highest clearing priority value, and to end at the second hub 410b. The server 130 can instruct the computer 105 of the vehicle 101 to move along the route 415 and clear the snow on the road segments 405 in the route 415. For example, the server 130 can instruct the computer 105 to actuate a propulsion 120 in the vehicle 101 to move the vehicle 101 to the identified road segment 405. Upon reaching the road segment 405 having the highest clearing priority value, the server 130 can instruct the computer 105 to actuate the snow plow 140 and the material spreader 150 to apply remediation material 195 and move snow on the road segment 405.

While the vehicle 101 is travelling along a route 415, the server 130 can remove one or more road segments 405 on the route 415 from the list of road segments 405. The server 130 can then determine a second road segment 405 having a highest clearing priority value and determine a second route 415 including the second road segment 405. The server 130 can instruct a second computer 105 in a second vehicle 101 to follow the second route 415 and to clear the second road segment 405. Alternatively, the server 130 can instruct the computer 105 in the vehicle 101 to follow a first route 415 and then follow a second route 415 upon completion of the first route 415.

The server 130 can continue to determine routes 415 until all of the road segments 405 in the list have been included in at least one route 415. Alternatively, the server 130 can continue to determine routes 415 until the remaining road segments 405 have clearing priority values below a predetermined threshold. The predetermined threshold can be determined based on an amount (e.g., measured or reported depth) of snow accumulation that conventional vehicles can accommodate on road segments. That is, the server 130 can determine to clear road segments 405 that have at least a minimum amount of snow accumulation, e.g., 3 inches, and can determine not to clear road segments 405 that are not in a route 415 and do not have snow accumulation above the minimum amount of snow accumulation. The server 130 can further determine the factors and road clearing priority values at predetermined time intervals, e.g., every 30 minutes, every hour, etc., to identify new road segments 405 that require clearing and to determine new routes 415 to clear the road segments 405.

The server 130 can receive data 115 from vehicles 101 following the routes 415. For example, the vehicles 101 can include image sensors 110 that collect visual data 115 of snow accumulation on the routes 415. Based on the data 115 collected by the vehicle 101 on the routes 415, the server 130 can add and/or remove road segments 405 from one or more of the routes 415. For example, if a sensor 110 on a vehicle 101 captures an image of a vehicle 101 accident on a road segment 405 that is not in one of the routes 415, the server 130 can adjust the route 415 for the vehicle 101 to include the identified road segment 405, clearing snow from the road segment 405 with the accident.

Figure 5:
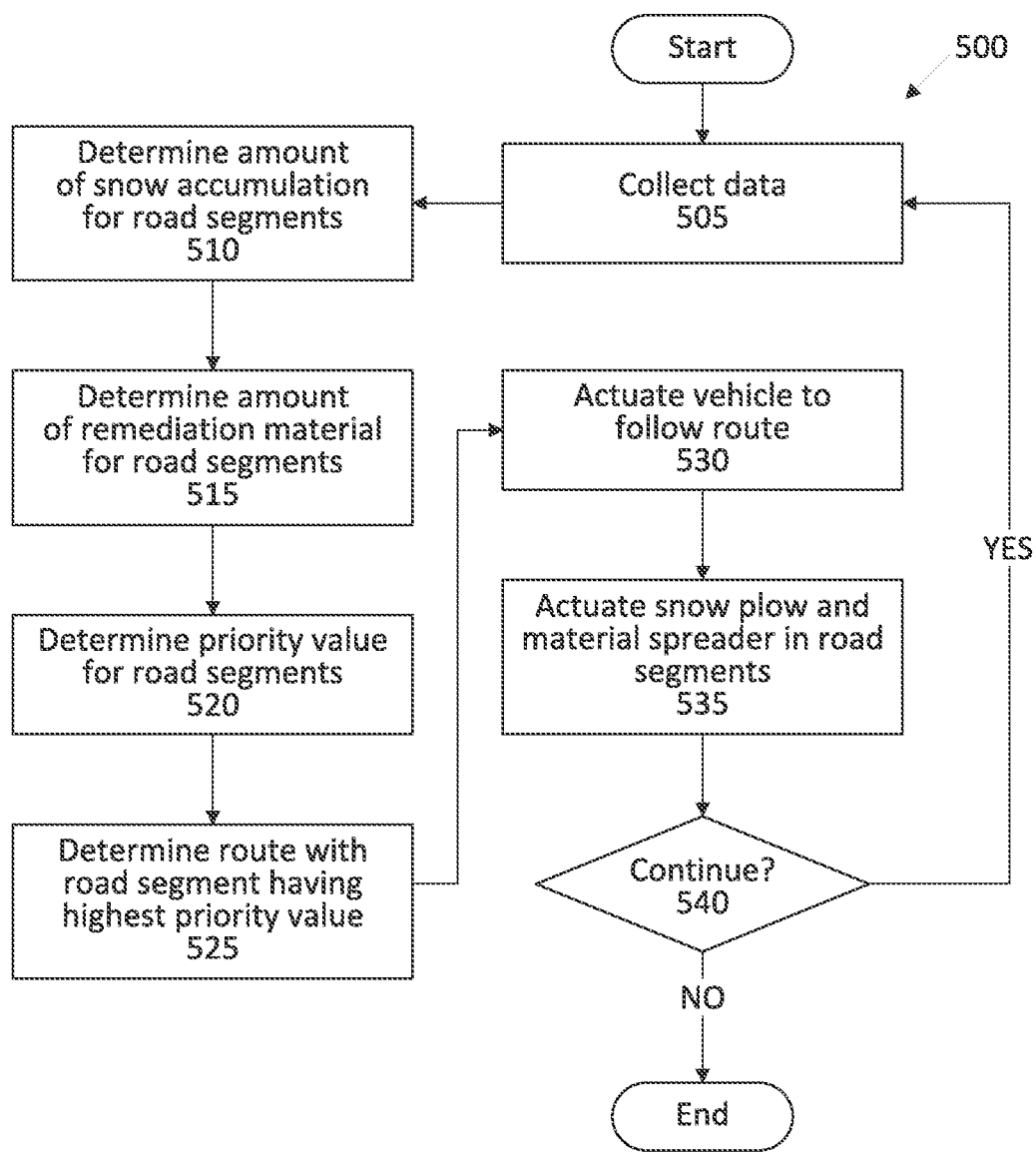
FIG. 5 is a block diagram of an example process for clearing snow accumulation from a roadway.

FIG. 5 illustrates an example process 500 for actuating a vehicle 101 to clear road segments 405. The process 500 begins in a block 505, in which the server 130 collects data 115. The data 115 can be, e.g., snow accumulation data, ice accumulation data, temperature data, etc. The server 130 can collect the data 115 from one or more sources, e.g., vehicles 101 on the roadway, a weather station, etc.

Next, in a block 510, the server 130 determines an amount of snow accumulation for each of a plurality of road segments 405. The amount of snow accumulation can be determined based on the data 115. The server 130 can determine the amount of snow accumulation as, e.g., a height of snow on the road segments 405 measured in inches.

Next, in a block 515, the server 130 determines an amount of remediation material 195 for each of the plurality of road segments 405. The server 130 can, based on the amount of snow accumulation, determine the amount of remediation material 195 for the road segment 405. For example, the server 130 can determine a length of the road segment 405 and a number of roadway lanes in the road segment 405 to determine a surface area of the road segment 405. The server 130 can determine a specified amount of remediation material 195 to cover the surface area of the road segment 405. The amount of remediation material 195 can further be determined based on whether the road segment 405 includes ice that can be difficult to remove with a snow plow 140.

Next, in a block 520, the server 130 determines a clearing priority value for each of the plurality of road segments 405. As described above, the server 130 can determine a plurality of factors indicating a priority that a specific road segment 405 should be cleared. For example, the server 130 can determine a location factor that increases the clearing priority value when the road segment 405 includes one or more specific types of locations, e.g., a hospital, a police station, a fire station, a municipal building, etc.

Next, in a block 525, the server 130 identifies a road segment 405 having a highest clearing priority value and determines a route 415 including the identified road segment 405. The server 130 can identify a hub 410 closest to the identified route segment 405 and determine a route 415 from the hub 410 that includes the identified route segment 405 and returns to the hub 410. Alternatively, the server 130 can determine a route 415 that starts at a first hub 410a, includes the identified route segment 405, and returns to a second hub 410b.

Next, in a block 530, the server 130 identifies a vehicle 101 and instructs a computer 105 in the vehicle 101 to actuate one or more components 120 to move the vehicle 101 to follow the route 415. For example, the server 130 can identify a vehicle 101 registered as a snow-clearing vehicle 101 and can instruct the computer 105 to actuate a propulsion 120 to move the vehicle 101 along the route 415.

Next, in a block 535, the server 130 instructs the computer 105 to actuate a snow plow 140 and/or a material spreader 150 on the vehicle 101. Based on the amount of snow accumulation and the amount of remediation material 195 for the road segment on which the vehicle 101 is currently traveling, the computer 105 can actuate the snow plow 140 to push snow from the road segment 405 and can actuate the material spreader 150 to deposit a predetermined amount of remediation material 195.

Next, in a block 540, the server 130 determines whether to continue the process 500. For example, if the server 130 has identified road segments 405 that require clearing but were not in the route 415, the server 130 can determine to continue the process 500 to clear the road segments 405. If the server 130 determines to continue, the process 500 returns to the block 505 to collect more data 115. Otherwise, the process 500 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computers 105 generally each include instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 500, one or more of the steps could be omitted, or the steps could be executed in a different order than shown in FIG. 5. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer including a processor and a memory, the memory storing instructions executable by the processor to:
   determine a route based on at least one of (a) an amount of snow accumulation, and (b) a predicted amount of remediation material, for each of a plurality of road segments;
   actuate a vehicle to follow the route;
   actuate at least one of a snow plow and a material spreader on the vehicle; and
   determine a snow accumulation threshold based on a predicted number of emergency vehicles on each road segment and to determine the route to include at least one road segment having an amount of snow accumulation exceeding the snow accumulation threshold.

2. The system of claim 1, wherein the instructions further include instructions to actuate a second vehicle to follow a second route including a road segment not in the route.

3. The system of claim 1, wherein the instructions further include instructions to receive data from the vehicle following the route and to determine a new route based on the data from the vehicle.

4. A system, comprising a computer including a processor and a memory, the memory storing instructions executable by the processor to:
   determine a route based on at least one of (a) an amount of snow accumulation, and (b) a predicted amount of remediation material, for each of a plurality of road segments;
   actuate a vehicle to follow the route;
   actuate at least one of a snow plow and a material spreader on the vehicle;
   determine a clearing priority value for each road segment based on at least one of the amount of snow accumulation and the predicted amount of material for each of a plurality of road segments; and
   determine the route to include the road segment with the highest clearing priority value, the clearing priority value of one of the road segments being a measure of a priority to clear the road segment.

5. The system of claim 4, wherein the route is based on at least one of a location of the road segment, a fuel amount to reach the road segment, a number of emergency vehicles in the road segment, a road grade of the road segment, and a curvature of the road segment.

6. The system of claim 4, wherein the instructions further include instructions to receive data from the vehicle following the route and to determine a new route based on the data from the vehicle.

7. The system of claim 4, wherein the instructions further include instructions to determine a second route to include the road segment with the highest clearing priority value and that is not in the route.

8. A system, comprising a computer including a processor and a memory, the memory storing instructions executable by the processor to:
   determine a route based on at least one of (a) an amount of snow accumulation, and (b) a predicted amount of remediation material, for each of a plurality of road segments;
   actuate a vehicle to follow the route;
   actuate at least one of a snow plow and a material spreader on the vehicle; and
   determine a snow accumulation threshold based on a predicted number of vehicles on each road segment and to determine the route to include at least one road segment having an amount of snow accumulation exceeding the snow accumulation threshold.

9. The system of claim 8, wherein the route is based on at least one of a location of the road segment, a fuel amount to reach the road segment, a number of emergency vehicles in the road segment, a road grade of the road segment, and a curvature of the road segment.

10. The system of claim 8, wherein the instructions further include instructions to receive data from the vehicle following the route and to determine a new route based on the data from the vehicle.

11. The system of claim 1, wherein the instructions further include instructions to determine a second route and, when the vehicle completes the route, actuate the vehicle to follow the second route.

12. The system of claim 4, wherein the instructions further include instructions to determine a second route and, when the vehicle completes the route, actuate the vehicle to follow the second route.

13. The system of claim 4, wherein the instructions further include instructions to actuate a second vehicle to follow a second route including a road segment not in the route.

14. The system of claim 8, wherein the instructions further include instructions to determine a second route and, when the vehicle completes the route, actuate the vehicle to follow the second route.

15. The system of claim 8, wherein the instructions further include instructions to actuate a second vehicle to follow a second route including a road segment not in the route.

* * * * *